United States Patent [19]

Noorlander

[11] 4,315,480
[45] Feb. 16, 1982

[54] TEAT CUPS FOR MILKING MACHINES
[76] Inventor: Daniel O. Noorlander, 508 W. 630 North, Orem, Utah 84057
[21] Appl. No.: 164,164
[22] Filed: Jun. 30, 1980
[51] Int. Cl.$^3$ .............................................. A01J 5/04
[52] U.S. Cl. ................................................. 119/14.49
[58] Field of Search ............... 119/14.47, 14.49–14.53, 119/14.38

[56] References Cited

U.S. PATENT DOCUMENTS

| | | | |
|---|---|---|---|
| 1,221,654 | 4/1917 | Bartram et al. | 119/14.5 |
| 1,476,788 | 12/1923 | Anderson | 119/14.49 |
| 1,657,667 | 1/1928 | Ellison | 119/14.49 |
| 1,982,452 | 11/1934 | Persoons et al. | 119/14.53 |
| 3,096,740 | 7/1963 | Noorlander | 119/14.49 |

FOREIGN PATENT DOCUMENTS 922742  1/1955  Fed. Rep. of Germany ... 119/14.49

Primary Examiner—Jay N. Eskovitz
Attorney, Agent, or Firm—Terry M. Crellin; B. Deon Criddle

[57] ABSTRACT

A teat cup assembly for automatic milking machines employing a vacuum milk line and a pulsating vacuum line is disclosed. The assembly comprises a rigid, tubular outer shell and an elongate, tubular, inflation member having a novel mouth-forming diaphragm at one end thereof for engaging the teat of a cow to retain the teat cup assembly from falling off the teat at the end point of milking. A sleeve member is adapted to secure the upper end of the inflation in expanded condition to the upper end of the shell. The sleeve member is also adapted to receive the mouth-forming diaphragm. The mouth-forming diaphragm has a central opening for receiving the teat of a cow, with the central opening having a circumference smaller than the cross-sectional circumference of the inflation. A protective cap member fits over the mouth-forming diaphragm and sleeve member. A lower cap member is adapted to secure the lower end of the inflation in expanded condition to the lower end of the shell, with the lower cap member having a nipple for connection to the vacuum milk line. The shell has a port therein adapted to be connected to a pulsating vacuum line. The mouth-forming member is preferably molded from silicone rubber and the inflation is made from extruded, tubular silicone rubber.

13 Claims, 8 Drawing Figures

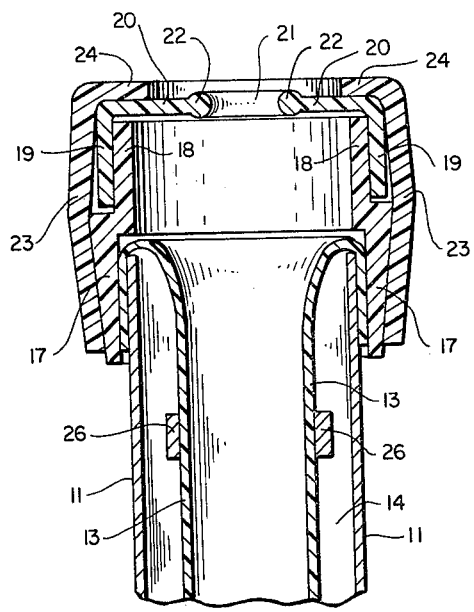
Fig. 2
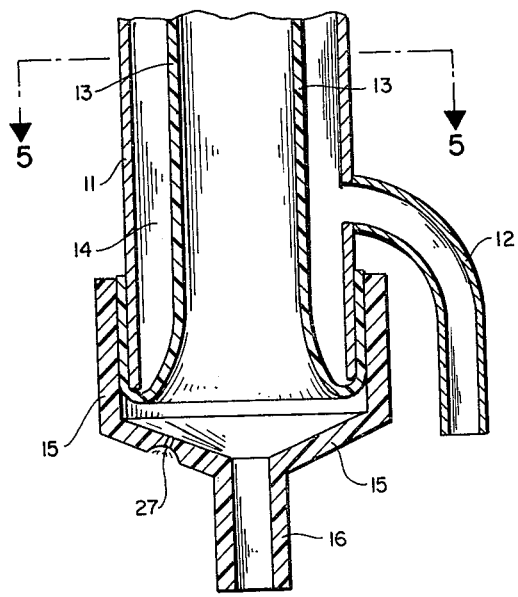
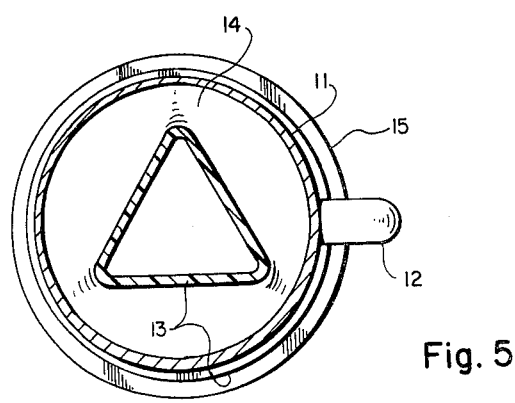
Fig. 5

TEAT CUPS FOR MILKING MACHINES

BACKGROUND OF THE INVENTION

1. Field

The invention relates to improved teat cup assemblies in vacuum operated, automatic milking machines.

2. State of the Art

Conventional automatic milking machines utilize teat cup assemblies including a hollow, rigid outer shell or cup having a port which is adapted to be attached to a pulsating vacuum line, and a resilient, tubular liner or inflation extending longitudinally of the shell or cup. The ends of the inflation make sealing engagement with the shell to form an annular vacuum chamber between the shell and the inflation. The pressure in the annular chamber is alternated between subatmospheric pressure and a higher pressure, typically atmospheric, by the pulsating vacuum line attached to the shell. A constant vacuum line is connected to the lower end of the inflation to draw milk from the cow's teat which is received in the upper end of the inflation. The interior of the inflation is, thus, maintained at a constant subatmospheric pressure, and the alternating pressure in the annular chamber periodically forces the walls of the inflation inwardly resulting in a massaging action on the teat as well as collapsing the walls of the inflation below the teat which periodically relieves the teat from exposure to the vacuum in the constant vacuum line.

It is important that the upper portion of the inflation grips the teat firmly to prevent vacuum loss and disengagement of the teat cup from the teat, as well as to prevent the teat cups from moving higher up on the teats during the pulsations of the milking machine, which can ultimately result in constriction of the teat and premature shut off of milk from the udder even though the udder is only partially emptied. The teats of different cows vary considerably in their diameter and length. Changes in teat sizes also occur during the milking. These variations and changes make it very difficult to produce teat cups which can be used in milking a number of cows. In my prior U.S. Pat. No. 3,308,788 there is disclosed a teat cup assembly in which a resilient disk element is mounted on top of the teat cup in position to engage the cow's teat and resiliently retain the cup from falling off the teat. Unfortunately, the teat cup assembly was relatively expensive both to manufacture and to maintain because of the number of individual components in the assembly. In other of my prior art patents, i.e., U.S. Pat. Nos. 3,659,557 and 3,096,740, teat cup assemblies are provided in which the inflation is molded so as to incorporate a diaphgagm and an elastic means, respectively, integrally therein. Other inflations which are molded so as to incorporate a resilient retaining element integrally therein as disclosed in U.S. Pat. Nos. 2,744,496; 3,771,494; and 3,873,521.

Objectives

A principal objective of the present invention is to provide an improvement in teat cup assemblies utilizing an inflation and teat engaging diaphragm made of resilient, elastomeric material, wherein a protective cap member is provided for securing the diaphragm portion to the assembly. A particular objective is to provide a teat cup assembly utilizing a molded diaphragm member having a central opening therein and an extruded, tubular inflation, wherein the opening in the diaphragm has a smaller circumference than the cross-sectional circumference of the tubular inflation. Another objective is to provide a teat cup assembly in which the inflation and diaphragm are made of silicone rubber which is not subject to deterioration due to soil, fat, ozone, etc., and which has been found to have a much greater life than assemblies made with molded rubber inflations. A further objective is to provide an inflation having a novel mouth portion which maintains sufficient contact with the teat of the cow so as to prevent the teat cup from dropping off the teat, but still sufficiently flexible to be used on teats of various sizes to improve milking efficiency and reduce tissue damage and mastitis.

SUMMARY OF THE INVENTION

The above objectives are achieved in accordance with the present invention by forming a novel, improved teat cup assembly utilizing a molded diaphragm member and an inflation made of extruded, tubular elastomeric material. Preferably both the diaphragm member and the inflation are formed from silicone rubber. Using extruded material in the inflation reduces the costs of the teat cup assemblies even when more expensive elastomeric material such as silicone rubber is used.

The teat cup assembly includes a rigid, tubular, outer shell having a port therein which is adapted to be connected to a source of pulsating vacuum. An elongate tubular inflation is received longitudinally within the outer shell. The inflation is of a sufficient length to extend beyond the opposite ends of the outer shell. The opposite end portions of the inflation are expanded and turned back over the respective ends of the outer shell, whereby a pulsating vacuum chamber is defined between the inflation and the shell.

A lower cap member is adapted to fit securely over the lower portion of the inflation which has been turned back over the lower end of the shell, so that the lower portion of the inflation is sealed tightly between the cap member and the outer shell. The lower cap member has a nipple extending therefrom which is adapted to be attached to the vacuum milk line of a milking machine. The milk line operates at a substantially constant vacuum.

A substantially cylindrical sleeve member is adapted to fit securely over the upper portion of the inflation which has been turned back over the upper end of the outer shell, so that the upper portion of the inflation is sealed tightly between the sleeve member and the outer shell.

A cup-like, teat entrance member, molded of a resilient flexible, elastomeric material, is adapted to fit on a substantially cylindrical extension which projects upwardly from the upper end of the sleeve member. The cylindrical extension projects substantially coaxially outwardly from the upper end of the shell when the sleeve member is in position over the upper end of the outer shell. The cup-like, teat entrance member comprises a substantially cylindrical side section which is adapted to fit over the cylindrical extension on the sleeve member. A diaphragm having a central opening therein is molded integrally to one end of the cylindrical side section of the teat entrance member, so that the diaphragm extends across the open end of the sleeve member adjacent to the upper end of the body forming member which has been expanded and turned back over the upper end of the shell. The central opening in the diaphragm is, thus, located substantially coaxial with the longitudinal axis of the inflation member. The opening in the diaphragm has a smaller circumference than the cross-sectional circumference of the inflation, and, thus, firm contact of the teat of a cow is made by the diaphragm when the teat cup assembly is positioned in milking position on the teat of the cow. The contact between the teat and the diaphragm is sufficient for teats of various sizes to prevent the inflation from moving further up on the teat during the latter stages of the milking period. Thus, the inflations can be used in milking a number of cows whose teats may vary in size from cow to cow. The diaphragm made from silicone rubber has been found to be sufficiently flexible and pliable to essentially eliminate tissue damage to the teat by the diaphragm.

A substantially cylindrical, upper cap member is provided which slides substantially tightly over the cylindrical side section of the teat entrance member and the sleeve member to securely hold the teat entrance member in place. The upper cap member also forms a shield to protect the elastomeric teat entrance member. The upper end of the upper cap member can be provided with an inwardly extending flange. The flange forms a seat which the outer perimeter of the diaphragm abuts, thereby providing added protection for the diaphragm.

Additional objects and features of the invention will become apparent from the following detailed description, taken together with the accompanying drawings.

THE DRAWINGS

Preferred embodiments of the present invention representing the best mode presently contemplated of carrying out the invention is illustrated in the accompanying drawings, in which:

FIG. 2 is a vertical cross-sectional view through the assembled unit of FIG. 1;

FIG. 3 is an enlarged, vertical, cross-sectional view through the teat entrance member of the teat cup assembly shown in FIGS. 1 and 2;

FIG. 4 is a top view of the assembly of FIG. 1;

FIG. 5 is a traverse, cross-sectional view taken along line 5—5 of FIG. 2;

DETAILED DESCRIPTION OF THE ILLUSTRATED EMBODIMENT

Figure 1:
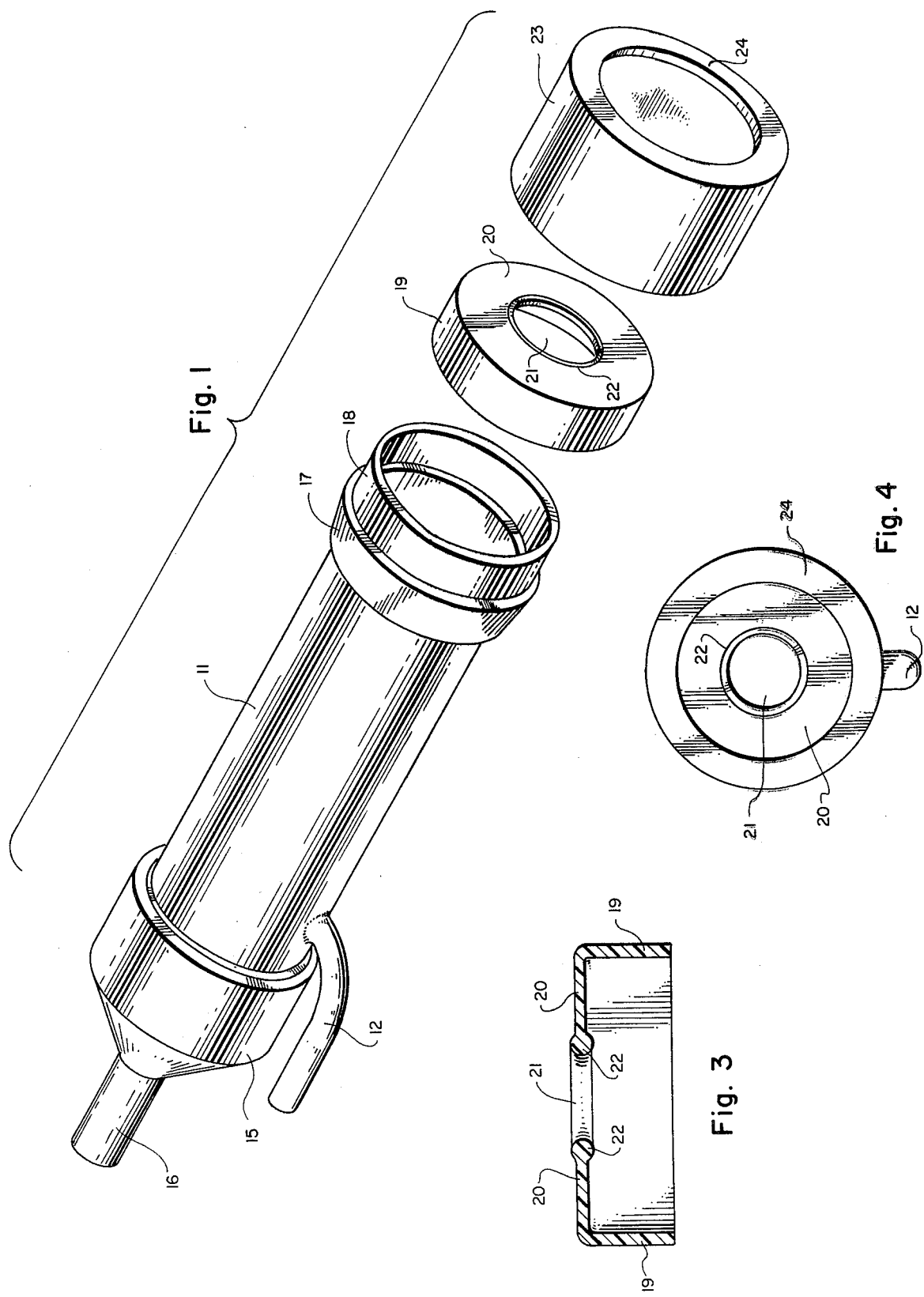
FIG. 1 is a pictorial view of one preferred embodiment of a teat cup assembly of this invention with the teat entrance member and upper cap member shown in exploded relationship to the remaining assembly.

A preferred embodiment of a teat cup assembly in accordance with the present invention is shown in the drawings. As illustrated, the teat cup assembly has a rigid, tubular, outer shell 11 on which is provided a port or nipple 12 which is adapted to be connected to a pulsating vacuum line. The outer shell 11 is made of a rigid synthetic resin or plastic material or of a suitable metal such as stainless steel.

An elongate, tubular inflation member 13 is adapted to be received longitudinally within the outer shell 11. The tubular inflation member 13 is formed from a resilient, flexible, elastomeric material, preferably silicone rubber. The silicone rubber inflations have much greater useful life than inflations made of rubber and other elastomeric materials. The tubular inflation member 13 is made of an extruded piece of material which preferably has a generally triangular cross-section as shown in FIG. 5, wherein the corners of the triangular shape are rounded and its sides are equal. Typically, the inflation is made of extruded tubular pieces having a wall thickness of about 1.5 to 3 millimeters, with the triangular sides being about 2 to 3 centimeters wide. A particular embodiment of the inflation of this invention which has been found to be acceptable with various cows from different breeds comprises a tubular member 13 made of silicone rubber having a triangular cross-sectional shape, with the three sides of equal width of about 2.5 centimeters and having a wall thickness of about 2 millimeters.

The inflation member 13 is of sufficient length to extend beyond the ends of the outer shell. The opposite end portions of the inflation member 13 are expanded into substantially circular configuration and turned back over the respective ends of the outer shell 11, whereby a pulsating vacuum chamber 14 is defined between the sides of inflation 13 and the outer shell 11.

A lower cap member 15 is provided to fit securely over the lower portion of the inflation 13 which is turned back over the lower end of the outer shell 11. The lower portion of the inflation 13 is, thus, sealed tightly between the cap member 15 and the outer shell 11, and the cap member 15 is, in turn, held securely on the lower end of the outer shell 11. A nipple 16 extends from the cap member 15 and is adapted to be connected to a milk line which operates at substantially constant vacuum. The cap member 15 is advantageously made of a rigid plastic material.

A substantially cylindrical sleeve member 17 is adapted to fit securely over the upper portion of the inflation 13 which has been turned back over the upper end of the outer shell 11, so that the upper portion of the inflation 13 is sealed tightly between the sleeve member 17 and the outer shell 11. The sleeve member 17 is also then held securely on the upper end of the outer shell 11. A substantially cylindrical extension 18 projects upwardly from the upper end of the sleeve member 17, so that when the sleeve member 17 is in position over the upper end of the outer shell 11, the cylindrical extension 18 extends outwardly from the upper end of the outer shell 11 substantially coaxially with the outer shell 11 and inflation 13.

A cup-like, teat entrance member made of a resilient, flexible, elastomeric material is adapted to fit over the cylindrical extension 18 of the sleeve member 17. The entrance member comprises a substantially cylindrical side section 19 which is adapted to fit over the upwardly extending portion 18 of the sleeve member 17. A diaphragm 20 is molded integrally to one end of the cylindrical side section 19 of the teat entrance member, so that when the cylindrical side section 19 is positioned on the sleeve member 17, the diaphragm 20 extends across the open end of the sleeve member 17. A central opening 21 is provided in the diaphragm 20 for reception of a cow's teat. The central opening 21 has a substantially circular shape and is substantially coaxial with the longitudinal axis of the inflation 13. The circumference of the opening 21 is smaller than the cross-sectional circumference of the unexpanded portion of the inflation 13, and is, thus, adapted to make firm contact with the teat of the cow. The contact between the teat and the diaphragm 20 is sufficient to prevent the teat cup assembly from falling off the teat during the latter stages of the milking period, and the supple resiliency of the diaphragm 20 allows the teat cup to be used on teats of various sizes without causing damage to the teats.

As illustrated in FIGS. 1-3, one preferred embodiment of the teat entrance member is molded so as to provide a teat engaging surface at the circumference of the opening 21 in diaphragm 20. Advantageously, a smooth torus 22 is provided around the perimeter of the opening 21 in diaphragm 20. The torus 22 has a generally circular cross-sectional shape as shown in FIGS. 2 and 3, with the diameter of the torus 22 being slightly greater than the thickness of the diaphragm 20. The torus 22 has been found to be ideally adapted to engaging the teat of a cow with firm yet gentle contact between the torus 22 and the teat of the cow. The torus 22 forms a smooth, supple opening having no sharp or ragged edges to irritate the teat of the cow. The teat entrance member is preferably molded from silicone rubber, and when silicone rubber is used, it has also been found that the opening 21 formed by the torus 22 in the diaphragm 20 has far greater resistance to rips or lacerations propagating from the opening 21 into the diaphragm 20. The thickness of the molded side section 19 and diaphragm 20 of the teat entrance member is between about 1.5 and 3 millimeters, preferably between about 2 and 2.5 millimeters.

Figure 6:
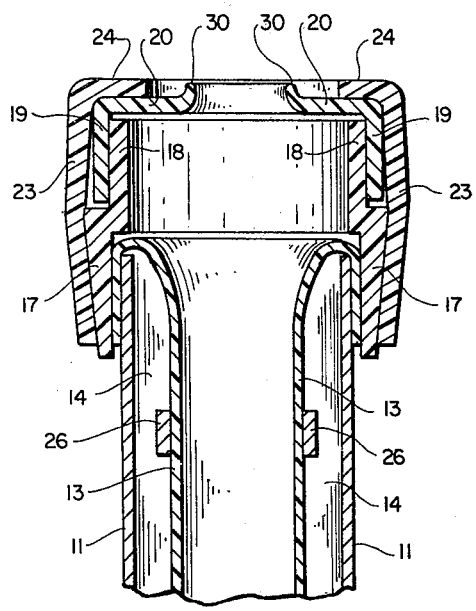
FIG. 6 is a vertical cross-sectional view through the upper portion of an assembled unit similar to that shown in FIG. 2, but showing a second preferred embodiment of the teat entrance member portion of the unit.
Figure 7:
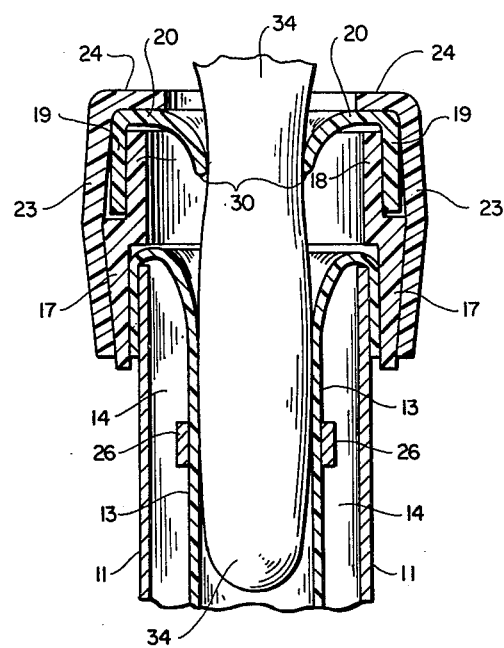
FIG. 7 is a view similar to that of FIG. 6 showing a cow's teat in position in the teat cup assembly.
Figure 8:
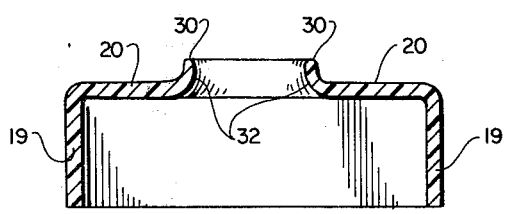
FIG. 8 is an enlarged, vertical, cross-sectional view through the teat entrance member of the teat cup assembly shown in FIGS. 6 and 7.

In FIGS. 6-8, an embodiment of the invention is illustrated showing a second preferred teat entrance member. As in the first embodiment, the entrance member comprises a substantially cylindrical side section 19 which fits over the upwardly extending portion 18 of the sleeve member 17, and a diaphragm 20 is molded integrally to one end of the side section 19 so that the diaphragm 20 extends across the open end of the sleeve member 17. A central opening of substantially circular shape is provided in the diaphragm 20 as in the first embodiment of the entrance member described hereinbefore. In the second preferred embodiment shown in FIGS. 6-8, the central opening in the diaphragm 20 is provided with a teat engaging surface comprising an upstanding flange or lip 30 which extends from the diaphragm in a direction opposite to that of the side section 19 when the device is not positioned on the teat of a cow (see FIGS. 6 and 8). The lip 20 is preferably joined to the diaphragm 20 with the lower surface of the diaphragm, i.e., the surface facing away from the direction in which the lip 20 extends when the device is not positioned on the teat of a cow, curving into the inner wall of the upstanding lip 30 as shown by reference numeral 32 in FIGS. 6 and 8. In addition, the upper surface of the diaphragm 20 curves into the outer wall of the upstanding lip 30.

When the teat cup device is positioned on the teat 34 of a cow as shown in FIG. 7, the upstanding lip 30 is pushed down into an inverted position in which the outer wall of the upstanding configuration becomes the inner wall of the downwardly extending lip 30 and forms a substantial teat engaging surface. As shown, the diaphragm 20 curves slightly downwardly and the upper surface thereof curves into the side of the lip 30 which engages the teat 34 of the cow when the device is positioned on the teat 34. The width of the lip 30, i.e., the height which it extends upwardly from the diaphragm, determines the surface area which engages the teat 34 when the device is positioned on the teat. The width should not be excessive so as to make it difficult to position the device on the treat of the cow. Generally, the width of the lip 30 is between about 2 to 7 millimeters, and preferably between about 4 to 5 millimeters.

A substantially cylindrical, upper cap member 23 is adapted to slide tightly over the teat entrance member and sleeve member 17 to securely hold the teat entrance member in place and to provide protection for the elastomeric teat entrance member. The cap member 23 is preferably made of a tough, resilient elastomeric plastic material of sufficient thickness to provide a protective cover for the cylindrical side sections 19 of the teat entrance member and to fit tightly over the teat entrance member and sleeve member 17. A flange or lip 24 is advantageously provided around the perimeter of the upper end of the cap member 23. As illustrated, the lip 24 extends inwardly from the outer end of the cap member 23 so as to form a seat upon which the outer perimeter of the diaphragm abuts when the cap member 23 is placed in position over the teat entrance member and sleeve. The lip 24 provides added protection for the diaphragm 22.

The sleeve member 17 is advantageously shaped so as to enhance the tight engagement of the cap member 23 to the teat cup assembly. As illustrated, the upper end of the sleeve member 17, i.e., the end of the sleeve member 17 from which the cylindrical extension 18 projects, has an outer diameter greater than the outer diameter of the lower end of the sleeve member 17, so that the outer surface of the sleeve member 17 tapers inwardly in a direction from its maximum diameter at its upper end to a smaller diameter at its lower end. The upper cap member 23 has an inner diameter no greater than the outer diameter of the lower end of the sleeve member 17, so that the cap members 23 is expanded slightly to fit over the enlarged upper end of the sleeve member 17. The cap member 23 is then held tightly and securely in place on the tapered surface of the sleeve member 17 but can be removed from the sleeve member when necessary.

A reinforced band 26 is advantageously positioned around the outer circumference of the inflation member 13, so as to be located anywhere between the upper end and about the midpoint thereof. Preferably, the reinforcing band 26 is positioned between about 2.5 centimeters and about 5 centimeters below the upper end of the outer shell 11. The reinforcing band 26 is preferably made of a narrow piece or band of tubing cut from the tubular material from which the inflation member 13 is made. The reinforcing band 26 is fitted over the inflation member 13 and bonded thereto. The band 26 provides sufficient resiliency to restrain the upper portion of the inflation to prevent excessive expansion in the vicinity of the reinforcing band 26 to prevent excessive teat penetration. This acts in concert with the resilient opening in the teat entrance member to prevent the teat cup assembly from moving up on the teat during the milking period. As has been described in the prior art, it is not desirable to allow the teat to enter into the inflation, or to allow the teat cup assembly to work its way up to and against the udder. The supple resilience of the inflation member of the present invention results in sufficiently firm contact with the teat to essentially eliminate undesirable penetration of the teat into the inflation as well as unwanted movement of the teat cup further up on the teat. The lower end of the inflation below the reinforcing band 31 is adapted to collapse during such cycle and periodically relieve the cow's teat from the vacuum in the milking line without exerting excessive pressure or pinching on the end of the cow's teat. The pinching of the ends of the cow's teats as occurs in prior art inflations is a major cause of mastitis and other damage to the cow's teats.

A small capillary or opening 27 can be provided in the lower cap member 15. The opening 27 permits a controlled amount of air to be drawn in by the vacuum applied by the constant vacuum milking line.

Although preferred embodiments of the apparatus have been illustrated and described, it is to be understood that the present disclosure is made by way of example and that various other embodiments are possible without departing from the subject matter coming within the scope of the following claims, which subject matter is regarded as the invention.

I claim:

1. A teat cup assembly for automatic milking machines which employ a milk line operating at substantially constant vacuum and a source of pulsating vacuum, said teat cup assembly comprising:

a rigid, tubular, outer shell having a port therein adapted to be connected to the source of pulsating vacuum;

an elongate, tubular inflation member made of a resilient, flexible, elastomeric material, said inflation being adapted to be received longitudinally within said outer shell, with the inflation being of sufficient length to extend beyond the ends of said outer shell and with the opposite end portions of said inflation being expanded and turned back over the respective ends of said outer shell, whereby a pulsating vacuum chamber is defined between said inflation and said shell;

a lower cap member adapted to fit securely over the lower portion of said inflation which is turned back over the lower end of said outer shell, whereby the lower portion of said inflation is sealed tightly between the cap member and the outer shell, said cap member having a nipple extending therefrom which is adapted to be connected to said milk line which operates at substantially constant vacuum;

a substantially cylindrical sleeve member adapted to fit securely over the upper portion of said inflation which is turned back over the upper end of said outer shell, whereby the upper portion of said inflation is sealed tightly between the sleeve member and the outer shell;

a cup-like, teat entrance member made of a resilient, flexible elastomeric material, said cup-like teat entrance member comprising a substantially cylindrical side section and a diaphragm having a central opening therein molded integrally to one end of said cylindrical side section, said cylindrical side section of said teat entrance member being adapted to fit over at least the upper portion of said sleeve member so that when the teat entrance member is positioned on said sleeve member said diaphragm extends across the open end of said sleeve member and the opening in said diaphragm is located substantially coaxial with the longitudinal axis of said inflation member; and a substantially cylindrical, upper cap member which is adapted to slide substantially tightly over the teat entrance member and sleeve member to securely hold the teat entrance member in place and to provide protection for the elastomeric teat entrance member.

2. A teat cup assembly in accordance with claim 1, wherein a smooth torus is formed around the edge of the central opening in the teat entrance member.

3. A teat cup assembly in accordance with claim 1, wherein a flange extends inwardly around one end of the upper cap member so as to form a seat which the outer perimeter of the diaphragm abuts thereby providing added protection for the diaphragm.

4. A teat cup assembly in accordance with claim 3, wherein:

the upper portion of said sleeve member is substantially cylindrical and the cylindrical side section of said teat entrance member fits upon said cylindrical upper portion of said sleeve member;

the lower portion of the sleeve member has an enlarged outer diameter adjacent to the lower end of said cylindrical upper portion and the surface of the lower portion of the sleeve member tapers inwardly in a direction towards the lower end thereof; and the inner diameter of the upper cap member is no greater than the outer diameter of the lower end of said sleeve member, whereby the cap member is expanded slightly over the upper end of said sleeve member and held tightly and securely in place on the tapered surface of said sleeve member.

5. A teat cup assembly in accordance with claim 1, wherein the sleeve member comprises an enlarged lower portion and a substantially cylindrical upper portion having an outer diameter smaller than the outer diameter of the enlarged lower portion, said cylindrical upper portion extending upwardly from the upper end of the lower portion, said lower portion of said sleeve member being adapted to fit over said upper portion of said inflation which is turned back over the upper end of said outer shell so that said cylindrical upper portion of said sleeve member extends upwardly from the upper end of said outer shell, and the cylindrical side section of said teat entrance member fits upon said cylindrical upper portion of said sleeve member.

6. A teat cup assembly in accordance with claim 5, wherein:

the upper end of the lower portion of said sleeve member has an outer diameter greater than the outer diameter of the lower end of the lower portion of said sleeve member, so that the outer surface of the lower portion of said sleeve member tapers inwardly in a direction from its upper end to its lower end; and the inner diameter of the upper cap member is no greater than the outer diameter of the lower end of the lower portion of said sleeve member, whereby the cap member is expanded slightly over the upper end of the lower portion of said sleeve member and held tightly and securely in place on the tapered surface of the lower portion of said sleeve member.

7. A teat cup assembly in accordance with claim 1, wherein the inflation member and the teat entrance member are made of silicone rubber.

8. A teat cup assembly in accordance with claim 1, wherein the central opening in the teat entrance member has a smaller circumference than the inner cross-sectional circumference of the inflation member.

9. A teat cup assembly in accordance with claim 8, wherein the inflation is made from extruded tubular material having a generally triangular cross-sectional shape.

10. A teat cup assembly in accordance with claim 1, wherein a reinforcing band of elastomeric material is placed around the outer circumference of the inflation member.

11. A teat cup assembly in accordance with claim 10, wherein the band is made of tubular material having the same cross-sectional shape and cross-sectional dimensions as the inflation and is expanded slightly to fit over the outer circumference of said inflation.

12. A teat cup assembly in accordance with claim 1, wherein the central opening in the diaphragm of the teat entrance member has a teat engaging portion at the circumference of said opening, said teat engaging portion comprising an upstanding flange or lip which is molded integrally to the diaphragm, with the lower surface of the diaphragm curving into the inner wall of the upstanding flange and with the upper surface of the diaphragm curving into the outer wall of the upstanding flange.

13. A teat cup assembly in accordance with claim 12, wherein the teat entrance member is made of silicone rubber.

* * * * *